United States Patent [19]

Kondo et al.

[11] Patent Number: 5,621,058

[45] Date of Patent: Apr. 15, 1997

[54] HYDROPHILIC CROSSLINKED POLYMER FINE PARTICLES AND PROCESS FOR PRODUCTION THEREOF

[75] Inventors: Masahiro Kondo; Hiromi Harakawa; Hiroshi Inoue, all of Hiratsuka, Japan

[73] Assignee: Kansai Paint Co., Ltd., Hyogo-ken, Japan

[21] Appl. No.: 547,539

[22] Filed: Oct. 24, 1995

[30] Foreign Application Priority Data

Oct. 24, 1994 [JP] Japan .................................. 6-284340

[51] Int. Cl.⁶ .......................... C08F 226/10; C08F 220/58
[52] U.S. Cl. ............................................ 526/264; 526/304
[58] Field of Search .......................... 526/264, 303.1, 526/328.5, 330, 332, 335, 341, 347, 348, 304

[56] References Cited

U.S. PATENT DOCUMENTS 3,313,591  4/1967  Tanner ...................... 8/115.5
4,792,593  12/1988  Schulz et al. ............. 526/240
4,981,936  1/1991  Good, Jr. et al. ......... 526/287

FOREIGN PATENT DOCUMENTS 1566863  5/1969  France .

*Primary Examiner*—Edward J. Smith
*Assistant Examiner*—Wu C. Cheng
*Attorney, Agent, or Firm*—Wenderoth, Lind & Ponack

[57] ABSTRACT

The present invention provides hydrophilic crosslinked polymer fine particles made of a copolymer composed of:

2–50% by weight of (a) a monoethylenic monomer having a polyoxyalkylene or polyvinylpyrrolidone chain, 20–97% by weight of (b) a (meth)acrylamide type monoethylenic monomer, 1–30% by weight of (c) a crosslinkable unsaturated monomer having at least one N-methylol or N-alkoxymethyl group and a polymerizable double bond, and 0–50% by weight of (d) other monoethylenic monomer.

Said polymer fine particles are superior in polymerization stability as well as in dispersion stability during storage, undergoes no adverse effect by dispersion stabilizer owing to no use of said stabilizer, and are suitably used for formation of a hydrophilic film.

13 Claims, No Drawings

HYDROPHILIC CROSSLINKED POLYMER FINE PARTICLES AND PROCESS FOR PRODUCTION THEREOF

The present invention relates to hydrophilic crosslinked polymer fine particles, particularly hydrophilic crosslinked polymer fine particles suitably used for formation of a hydrophilic film; a process for production of the polymer fine particles; and a hydrophilic film-forming aqueous coating composition containing the polymer fine particles.

As one process for synthesizing hydrophilic crosslinked polymer fine particles, a process is known which comprises conducting dispersion polymerization using acrylamide as a main monomer component, in a water-miscible organic solvent capable of dissolving the monomer components but substantially incapable of dissolving the polymer formed. In this process, however, when the dispersion polymerization is conducted in the absence of any dispersion stabilizer, the polymer fine particles formed are agglomerated and precipitated in many cases; therefore, the dispersion polymerization is conducted generally in the presence of a dispersion stabilizer for formed polymer [see, for example, Japanese Patent Application Kokai (Laid-Open) No. 132705/1992].

Even in the above process using a dispersion stabilizer, however, polymer agglomerates are often formed during the polymerization and, moreover, since the dispersion stabilizer adheres onto the formed polymer particles by mere physical adsorption, the polymer particles have a problem in dispersion stability during storage, depending upon the storage condition. Furthermore, when the polymer particles are used for formation of a film, the uncrosslinked dispersion stabilizer remains in the formed film depending upon the curing system employed, which allows the film to have significantly inferior properties.

Generally, in the dispersion polymerization of a (meth-)acrylamide type monomer, a solvent containing a large amount of a lower alcohol is used as the reaction solvent. This solvent, however, has a low flash point; consequently, use of the dispersion obtained from the dispersion polymerization, in coating application has a handling problem.

The main object of the present invention is to provide hydrophilic crosslinked polymer fine particles which are superior in in-solvent polymerization stability as well as in dispersion stability during storage, which undergoes no adverse effect by dispersion stabilizer owing to no use of any dispersion stabilizer, and which can be suitably used for formation of a hydrophilic film.

The other object of the present invention is to provide a hydrophilic film-forming aqueous coating composition containing the above hydrophilic crosslinked polymer fine particles, which can form a film having excellent hydrophilicity.

The present inventors made a study in order to solve the above-mentioned problems of the prior art and, as a result, newly found out that the above problems can be solved by hydrophilic crosslinked polymer fine particles obtained by polymerization of a monomer mixture containing given amounts of essential components, i.e. a monomer having at least one polymerizable double bond and a polyoxyalkylene or polyvinylpyrrolidone chain, a (meth)acrylamide type monomer and a crosslinkable unsaturated monomer having at least one N-methylol or N-alkoxymethyl group. The present invention has been completed based on the finding.

According to the present invention there is provided hydrophilic crosslinked polymer fine particles made of a copolymer composed of:

2–50% by weight of (a) a hydrophilic monomer having, in the molecule, at least one polymerizable double bond and a polyoxyalkylene or polyvinylpyrrolidone chain, 20–97% by weight of (b) at least one (meth)acrylamide type monomer selected from the group consisting of the compounds represented by the following general formula [1]:

(wherein $R^1$ is a hydrogen atom or a methyl group; and $R^2$ and $R^3$ may be the same or different and are each a hydrogen atom or an alkyl group having 1–5 carbon atoms with a proviso that the sum of the carbon atoms of $R^2$ and $R^3$ is 5 or less), 1–30% by weight of (c) a crosslinkable unsaturated monomer having, in the molecule, at least one N-methylol or N-alkoxymethyl group and a polymerizable double bond, and 0–50% by weight of (d) a monomer other than the above (a), (b) and (c), having a polymerizable unsaturated group in the molecule.

The hydrophilic crosslinked polymer fine particles of the present invention are hereinafter described in more detail.

Hydrophilic Monomer (a)

The monomer (a) is a compound having, in the molecule, at least one, preferably one or two, particularly preferably one polymerizable double bond and a polyoxyalkylene or polyvinylpyrrolidone chain. Typical examples thereof are the compounds represented by the following general formulas [2], [3] and [4]:

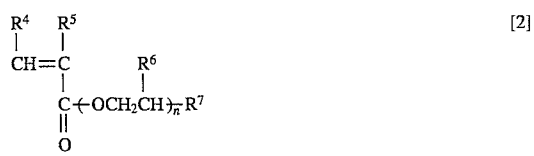

[wherein $R^4$, $R^5$ and $R^6$ may be the same or different and are each a hydrogen atom or a methyl group; n is an integer of 10–200; $R^7$ is —OH, —OCH$_3$, —SO$_3$H or —SO$_3^-M^+$ (where $M^+$ is Na$^+$, K$^+$, Li$^+$, NH$_4^+$ or an organic ammonium group); $R^6$s in the n groups represented by:

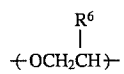

may be the same or different; the above organic ammonium group may be a primary, secondary, tertiary or quaternary organic ammonium group, and the nitrogen atom has at least one organic group and 0–3 hydrogen atoms bonded thereto; examples of the organic group are an alkyl group of 1–8 carbon atoms, an aryl group and an aralkyl group, all of which may contain a hetero atom(s) such as O, S, N and/or the like],

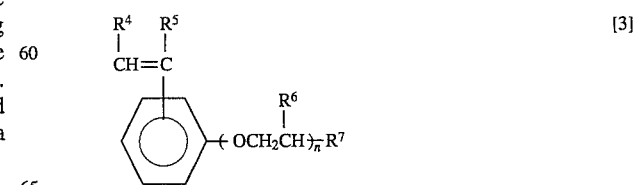

(wherein $R^4$, $R^5$, $R^6$, $R^7$ and n have the same definitions as given above),

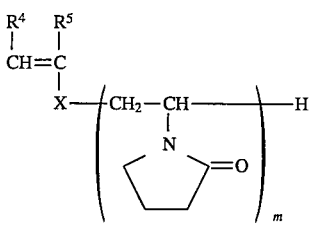

(wherein $R^4$ and $R^5$ have the same definitions as given above; X is a bivalent organic group having 5–10 carbon atoms, which may contain an O, S or N atom(s); and m is an integer of 10–100).

Specific examples of the "bivalent organic group having 5–10 carbon atoms, which may contain an O, S or N atom(s)" represented by X in the above general formula [4] include a group represented by the following formula.

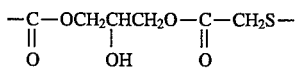

The monomer (a) is preferably a compound of formula [2] or [3], particularly a compound of formula [2] or [3] wherein n is 30–200, particularly 40–150, in view of, for example, the dispersion stability of the resulting polymer fine particles when the monomer (b) is used in a large amount. Particularly preferable is a compound of formula [2] or [3] wherein $R^4$ is a hydrogen atom, $R^5$ is a hydrogen atom or a methyl group, and $R^6$ is a hydrogen atom.

(Meth)acrylamide Type Monomer (b)

The monomer (b) used for forming the polymer fine particles of the present invention is at least one compound selected from the compounds represented by the following general formula [1]:

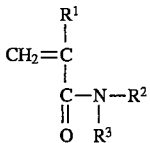

(wherein $R^1$ is a hydrogen atom or a methyl group; and $R^2$ and $R^3$ may be the same or different and are each a hydrogen atom or an alkyl group having 1–5 carbon atoms with a proviso that the sum of the carbon atoms of $R^2$ and $R^3$ is 5 or less).

In the above formula [1], the "alkyl group having 1–5 carbon atoms" which may be represented by $R^2$ or $R^3$, can have a straight chain or a branched chain. Examples thereof are a methyl group, an ethyl group, an n-propyl group, an isopropyl group, an n-butyl group, an isobutyl group, a tert-butyl group and an amyl group.

Typical examples of the monomer (b) represented by the above general formula [1] are acrylamide, methacrylamide, N-methylacrylamide, N-methylmethacrylamide, N,N-dimethylacrylamide, N,N-dimethylmethacrylamide, N-ethylacrylamide, N-ethylmethacrylamide, N-n-propylacrylamide, N-n-propylmethacrylamide, N-isopropylacrylamide, N-isopropylmethacrylamide and N-n-butylacrylamide. Of these, particularly preferable are acrylamide, methacrylamide, N-methylacrylamide and N-methylmethacrylamide.

Crosslinkable Unsaturated Monomer (c)

The crosslinkable unsaturated monomer (c) used for forming the polymer fine particles of the present invention is a component which contributes to the crosslinking of the formed particles, and is a compound having, in the molecule, at least one, preferably one to two, particularly one N-methylol or N-alkoxymethyl group and a polymerizable double bond. The alkoxy moiety of the "N-alkoxymethyl group" is generally an alkoxyl group having 1–6 carbon atoms; and a methoxy group, an ethoxy group, an n-propoxy group, an isopropoxy group, an n-butoxy group, a tert-butyl group or the like is preferred.

Typical examples of the crosslinkable unsaturated monomer (c) are N-methylolacrylamide, N-methylolmethacrylamide, N-methoxymethylacrylamide, N-methoxymethylmethacrylamide, N-ethoxymethylacrylamide, N-ethoxymethylmethacrylamide, N-n-butoxymethylacrylamide and N-n-butoxymethylmethacrylamide. Of these, particularly preferable are N-methylolacrylamide, N-methylolmethacrylamide, N-methoxymethylacrylamide and N-n-butoxymethylacrylamide.

Monomer (d)

The monomer (d) used as necessary for forming the polymer fine particles of the present invention is a compound other than the above monomers (a), (b) and (c), which has a polymerizable unsaturated group in the molecule and which is copolymerizable with the monomers (a), (b) and (c).

Typical examples of the monomer (d) are $C_{1-24}$ alkyl or cycloalkyl esters of (meth)acrylic acid, such as methyl (meth)acrylate, ethyl (meth)acrylate, butyl (meth)acrylate, hexyl (meth)acrylate, octyl (meth)acrylate, lauryl (meth)acrylate, cyclohexyl (meth)acrylate and the like; $C_{2-8}$ hydroxyalkyl esters of (meth)acrylic acid, such as 2-hydroxyethyl (meth)acrylate, hydroxypropyl (meth)acrylate, hydroxybutyl (meth)acrylate and the like; carboxyl group-containing unsaturated monomers such as acrylic acid, methacrylic acid, crotonic acid, itaconic acid, maleic acid, fumaric acid, monobutyl itaconate, monobutyl maleate and the like; polymerizable unsaturated nitriles such as acrylonitrile, methacrylonitrile and the like; aromatic vinyl compounds such as styrene, α-methylstyrene, vinyl toluene, α-chlorostyrene and the like; $C_{3-8}$ nitrogen-containing alkyl esters of (meth)acrylic acid, such as N,N-dimethylaminoethyl (meth)acrylate, N,N-dimethylaminopropyl (meth)acrylate and the like; epoxy group-containing unsaturated monomers such as glycidyl acrylate, glycidyl methacrylate, allyl glycidyl ether, 3,4-epoxycyclohexylmethyl acrylate, 3,4-epoxycyclohexylmethyl methacrylate and the like; α-olefins such as ethylene, propylene and the like; diene compounds such as butadiene, isoprene and the like; vinyl esters such as vinyl acetate, vinyl propionate and the like; and vinyl ethers such as ethyl vinyl ether, n-propyl vinyl ether and the like. These compounds can be used singly or in combination of two or more of them. Use of a hydrophobic compound in a large amount must be avoided because it gives polymer fine particles of low hydrophilicity.

The copolymer of the monomers (a) to (c) or (a) to (d) can be subjected to crosslinking by the dehydration-condensation or alcohol elimination occurring between the N-methylol or N-alkoxymethyl groups present in the crosslinkable unsaturated monomer (c) units and subsequent formation of (=N—$CH_2$—O—$CH_2$—N=) bond. When the monomer (d) is a monomer having a functional group (e.g. hydroxyl group) reactive with the N-methylol or N-alkoxymethyl group of the crosslinking unsaturated monomer (c), the above copolymer can be subjected to crosslinking not only by the above-mentioned reaction between the N-methylol or N-alkoxymethyl groups but also by the reaction between the N-methylol or N-alkoxymethyl group of each monomer (c) unit and the functional group of each monomer (d) unit.

Production of Hydrophilic Crosslinked Polymer Fine Particles

The hydrophilic crosslinked polymer fine particles of the present invention can be produced by polymerizing the hydrophilic monomer (a), (meth)acrylamide type monomer (b), crosslinkable unsaturated monomer (c) and, as necessary, monomer (d) all mentioned above, in the absence of any dispersion stabilizer in a water-miscible organic solvent capable of dissolving the above monomers but substantially incapable of dissolving the copolymer formed or in a mixed solvent of the water-miscible organic solvent and water.

In the polymerization, the proportions of the monomers used can be the same as those desired for the copolymer formed, and can be as follows, for example, Hydrophilic monomer (a)
2–50% by weight, preferably 2–40% by weight, more preferably 5–35% by weight
(Met)acrylamide type monomer (b)
20–97% by weight, preferably 40–97% by weight, more preferably 40–90% by weight
Crosslinkable unsaturated monomer (c)
1–30% by weight, preferably 2–20% by weight, more preferably 2–15% by weight
Monomer (d)
0–50% by weight, preferably 0–40% by weight, more preferably 0–35% by weight When the amount of the hydrophilic monomer (a) is less than 2% by weight, it is difficult to sufficiently stabilize the polymer particles formed, and agglomerates are easily formed during polymerization or during storage. When the amount is more than 50% by weight, the polymer particles formed dissolve easily in the reaction solvent and a large portion of the polymer formed is dissolved, making it impossible to form polymer fine particles satisfactorily.

When the amount of the (meth)acrylamide type monomer (b) is less than 20% by weight, the polymer formed dissolves easily in the reaction solvent, making it difficult to form polymer fine particles. When the amount is more than 97% by weight, the stability of polymer fine particles during polymerization and during storage is insufficient and agglomerates are formed easily.

When the amount of the crosslinkable unsaturated monomer (c) is less than 1% by weight, the crosslinking degree of the polymer particles formed is low and, when other solvent is added later, the polymer particles may cause swelling and dissolution depending upon the solvent added. When the amount is more than 30% by weight, agglomerates are formed in a large amount during polymerization, making it difficult to produce desired polymer fine particles stably.

The hydrophilic monomer (a) used in production of the polymer fine particles of the present invention contains, in the molecule, a polyoxyalkylene or polyvinylpyrrolidone chain of high hydrophilicity and plays a role of dispersing and stabilizing the polymer formed. Therefore, no use of any dispersion stabilizer is necessary in production of the polymer fine particles of the present invention.

In production of the polymer fine particles of the present invention, there is used, as the reaction solvent, a water-miscible organic solvent capable of dissolving the monomers mixture but substantially incapable of dissolving the copolymer formed, or a mixed solvent of the above water-miscible organic solvent and water. Herein, "water-miscible" refers to "soluble in water at 20° C. in any proportion".

The water-miscible organic solvent can be any organic solvent as long as it satisfies the above requirement. However, particularly preferred from the standpoint of the polymerization stability is a water-miscible organic solvent containing at least 50% by weight, particularly at least 70% by weight of an organic solvent having a solubility parameter (SP) of generally 9–11, particularly 9.5–10.7. Incidentally, "solubility parameter (SP)" used in the present specification is based on the description made in Journal of Paint Technology, Vol. 42, No. 541, pp. 76–118 (Feb., 1970).

Examples of the organic solvent having a SP of the above range are alkylene glycol monoalkyl ethers such as ethylene glycol monobutyl ether, propylene glycol monomethyl ether, ethylene glycol monoethyl ether, diethylene glycol monoethyl ether, diethylene glycol monobutyl ether and the like. Of these, particularly preferable are ethylene glycol monobutyl ether and propylene glycol monomethyl ether.

The water-miscible organic solvent can contain, besides the organic solvent having a SP of 9–11, other water-miscible or water-immiscible organic solvent. Preferable examples of the other organic are water-miscible organic solvents such as methanol, ethanol, isopropyl alcohol and the like. Desirably, the other organic solvent is used in an amount of 50% by weight or less, particularly 30% by weight or less based on the total amount of the organic solvents.

When a mixed solvent of the water-miscible organic solvent and water is used as the reaction solvent, the preferable content of water in the mixed solvent is generally 60 parts by weight or less, particularly 40 parts by weight or less per 100 parts by weight of the water-miscible organic solvent, in view of the polymerization stability of polymer formed, etc.

The copolymerization of the hydrophilic monomer (a), the (meth)acrylamide type monomer (b), the crosslinkable unsaturated monomer (c) and the monomer (d) is conducted generally in the presence of a radical polymerization initiator. The radical polymerization initiator can be one known per se. Examples thereof are peroxides such as benzoyl peroxide, lauroyl peroxide, di-tert-butyl peroxide, cumene hydroperoxide, tert-butyl peroctoate, tert-butyl peroxy-2-ethylhexanonate and the like; azo compounds such as 2,2'-azobisisobutyronitrile, 2,2'-azobis(2,4-dimethylvaleronitrile), 2,2'-azobis(4-methoxy-2,4-dimethylvaleronitrile), dimethyl 2,2'-azobisisobutyrate, 4,4'-azobis(4-cyanopentanoic acid) and the like; amidine compounds such as 2,2'-azobis(2-amidinopropane) dihydrochloride, 2,2'-azobis(N,N'-dimethyleneisobutylamidine), 2,2'-azobis(N,N'-dimethyleneisobutylamidine) dihydrochloride and the like; persulfates such as potassium persulfate and ammonium persulfate and the like; and the combinations of the persulfate with sodium thiosulfate, an amine or the like. These initiators can be used singly or in combination of two or more of them. The amount of the radical polymerization initiator used can be generally 0.2–5% by weight based on the total amount of the monomers.

The polymerization temperature can be varied depending upon the kind of the polymerization initiator used, etc., but an appropriate polymerization temperature is generally about 50° –about 160° C., particularly 90°–160° C. The reaction time can be about 0.1–10 hours. By employing a polymerization temperature of 90° C. or more, there occurs, during the polymerization, a crosslinking reaction between the N-methylol or N-alkoxymethyl groups of the monomer (c) and/or between the N-methylol or N-alkoxymethyl group of the monomer (c) and the functional group of the monomer (d) when the monomer (d) is present, whereby the intraparticle crosslinking of polymer particles can be allowed to proceed. When the polymerization temperature is lower than 90° C., substantially no intraparticle crosslinking takes place generally during the polymerization; therefore, in that case, the polymer formed is heated at a temperature of 90° C. or more for 0.2–5 hours after the polymerization reaction to allow the intraparticle crosslinking to proceed.

A crosslinking catalyst may be added as necessary to the polymerization system in order to allow the intraparticle crosslinking of polymer particles to proceed as quickly as possible during or after the polymerization reaction. The crosslinking catalyst includes, for example, strong acid catalysts such as dodecylbenzenesulfonic acid, paratoluenesulfonic acid and the like; and polymerizable double bond-containing strong acid catalysts such as sulfoethyl methacrylate and the like.

There is no particular restriction as to the particle diameters of the present polymer fine particles produced as above. However, it is preferable that the polymer fine particles have an average particle diameter of generally 0.03–1 µm, preferably 0.05–0.6 µm in view of the stability of the polymer fine particles formed, the prevention of formation of agglomerates, etc. This average particle diameter can be measured by the use of a particle diameter tester, for example, Coulter Model N4MD (a product of Coulter Co.).

The polymer fine particles of the present invention have, at the surfaces, the chemically bonded polyoxyalkylene or polyvinylpyrrolidone chains derived from the monomer (a), with the chains oriented outward. Therefore, the polymer fine particles, although containing no dispersion stabilizer, are highly superior in polymerization stability in water-miscible organic solvent or in mixed solvent of said water-miscible organic solvent and water, as well as in dispersion stability during storage, and their surfaces are hydrophilic.

Further, the present polymer fine particles are crosslinked inside the particles owing to the presence of the monomer (c) units. Therefore, the polymer fine particles can hold the shape even in a medium (e.g. an aqueous coating) containing a large amount of water or even when heated (the particles are not easily melted by heating).

The present polymer fine particles can find applications in hydrophilizing agent, liquid crystal spacer, column filler, non-staining coating, etc.

The hydrophilic crosslinked polymer fine particles of the present invention can be made, in one preferable application, into a hydrophilic film-forming coating composition by mixing with an water-miscible film-forming resin in an aqueous medium substantially incapable of dissolving the polymer fine particles but capable of dissolving or dispersing the water-miscible film-forming resin.

The water-miscible film-forming resin used in the preparation of the above coating composition can be any resin as long as it does not significantly impair the hydrophilicity of the polymer fine particles, can be dissolved in the aqueous medium or dispersed therein in fine particles (e.g. in the form of an emulsion), and can form a continuous resin film on the surface of the material coated. As the water-miscible film-forming resin, there can be used, for example, a polyvinyl alcohol, a polycarboxymethyl cellulose, an aqueous acrylic resin emulsion, an aqueous polyester emulsion, an aqueous polyurethane emulsion and an ethylene-acrylic acid ionomer resin.

The amount of the water-miscible film-forming resin used can be varied over a wide range depending upon the application of the coating composition, but the resin is preferably used in a weight ratio of hydrophilic crosslinked polymer fine particles/water-miscible film-forming resin, of generally 1/99 to 90/10, particularly 10/90 to 80/20, more particularly 15/85 to 70/30.

As the aqueous medium used in the hydrophilic film-forming coating composition, there can be used water, or a mixed solvent of water and the above-mentioned water-miscible organic solvent wherein the content of water is 50% by weight or more, preferably 70% by weight or more.

The solid content of the coating composition is not particularly restricted, but can be generally 3–60% by weight, preferably 5–50% by weight.

The coating composition may further comprise, as necessary, coating additives such as neutralizing agent, surfactant, curing agent, levelling agent, anti-fungal agent, coloring pigment, rust-preventive pigment, extender pigment and the like. The surfactant includes, for example, a salt of a dialkylsulfosuccinic acid ester and an alkylene oxide silane compound. The curing agent includes, for example, an amino-aldehyde resin, a blocked isocyanate compound, a polyepoxy compound and a chelate compound of a metal selected from Ti, Zr and Al.

The coating composition of the present invention can form a hydrophilic film by being coated on a material to be coated and being dried and can therefore be widely used in applications wherein the formation of a hydrophilic film is desired. The material to be coated is not particularly restricted and includes metals (e.g. iron, aluminum, zinc, copper, tin and metal-plated steel); plastics; glass; wood; and so forth. The film thickness in which the coating composition is coated, is not particularly restricted, either, but can be generally 0.5–5.0 µm as dried film thickness when the material to be coated is an aluminum fin of heat exchanger.

As described above, the hydrophilic crosslinked polymer fine particles are superior in polymerization stability in solvent as well as in dispersion stability during storage, undergo no adverse effect by dispersion stabilizer owing to no use of the stabilizer, and can be suitably used for formation of a hydrophilic film.

The hydrophilic film-forming aqueous coating composition containing the hydrophilic crosslinked polymer fine particles of the present invention, when coated on a material to be coated, can form fine unevenness thereon owing to the presence of hydrophilic resin fine particles and moreover can exhibit excellent hydrophilicity because the fine particles themselves have hydrophilicity. When the coating composition is coated on an aluminum fin to form a film thereon and the resulting fin is subjected to molding, as compared with a case using a conventional coating containing inorganic particles of silica or the like, the abrasion of mold during molding is less because the hydrophilic resin fine particles are softer than the inorganic particles.

The present invention is hereinafter described more specifically by way of Examples. In the followings, parts and % are by weight in all cases.

EXAMPLE 1

200 parts of propylene glycol monomethyl ether was placed in a flask equipped with a nitrogen inlet tube, an Allihn condenser, a dropping funnel and a mechanical stirrer, and heated to 118° C. Then, the following mixture of monomers, a solvent and an initiator was dropped into the flask in 5 hours. After the dropping, the mixture was kept at 118° C. for 1 hour.

Blemmer PME-4000 (*1) 20 parts

Acrylamide 60 parts

N-methylolacrylamide 20 parts

Propylene glycol monomethyl ether 200 parts 2,2'-Azobis(2-methylbutyronitrile) 1.5 parts The resulting dispersion was an opaque white stable dispersion having a solid content of 20% and an average particle diameter (of resin particles) of 345 nm.

*1 Blemmer PME-400: a compound (a product of Nippon Oils & Fats Co., Ltd.) represented by the following formula:

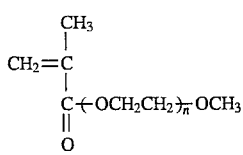

(wherein n has an average value of about 98).

EXAMPLE 2

200 parts of ethylene glycol monobutyl ether was placed in a flask equipped with a nitrogen inlet tube, an Allihn condenser, a dropping funnel and a mechanical stirrer, and heated to 140° C. Then, the following mixture of monomers, a solvent and an initiator was dropped into the flask in 5 hours. After the dropping, the mixture was kept at 140° C. for 1 hour.

RMA-300M (*2) 15 parts

Acrylamide 55 parts

N-butoxymethylacrylamide 15 parts

2-Hydroxyethyl methacrylate 15 parts

Ethylene glycol monobutyl ether 200 parts 2,2'-Azobis(2-methylbutyronitrile) 1.5 parts The resulting dispersion was an opaque white stable dispersion having a solid content of 20% and an average particle diameter (of resin particles) of 441 nm.

*2 RMA-300M: a compound (a product of Nippon Nyukazai Co., Ltd.) represented by the following formula

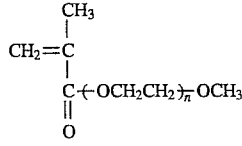

(wherein m has an average value of about 30).

PRODUCTION EXAMPLE 1

60 parts of propylene glycol monomethyl ether was fed into a flask equipped with a nitrogen inlet tube, a condenser, a dropping funnel and a mechanical stirrer, and heated to 90° C. Thereto were dropwise added, simultaneously and in 2 hours, a solution consisting of 100 parts of N-vinylpyrrolidone, 2 parts of 2,2'-azobis(isobutyronitrile) and 5 parts of propylene glycol monomethyl ether and a solution consisting of 5 parts of mercaptoacetic acid and 30 parts of propylene glycol monomethyl ether. 1 hour after the dropwise addition, a solution consisting of 1 part of 2,2'-azobis(2,4-dimethylvaleronitrile) and 10 parts of propylene glycol monomethyl ether was dropwise added in 1 hour. The mixture was stirred for 1 hour and then cooled to obtain a polyvinylpyrrolidone solution having a solid content of 50%.

PRODUCTION EXAMPLE 2

To 800 parts of the polyvinylpyrrolidone solution having a solid content of 50%, obtained in Production Example 1 were added 26.6 parts of glycidyl methacrylate and 1.8 parts of tetraethylammonium bromide. The mixture was stirred at 110° C. for 7 hours to obtain a polyvinylpyrrolidone macromonomer solution (solid content: 52%) represented by the following formula

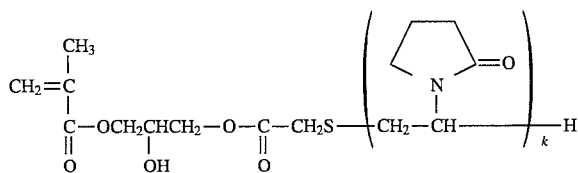

(wherein k has an average value of about 25).

EXAMPLE 3

Polymerization was conducted in the same manner as in Example 1 except that the mixture used in Example 1 was changed to the following mixture of monomers, a solvent and an initiator.

Polyvinylpyrrolidone macromonomer solution (solid content: 52%) obtained in Production Example 2 38.5 parts Acrylamide 50 parts N-methylol acrylamide 20 parts 2-Hydroxyethyl methacrylate 10 parts Propylene glycol monomethyl ether 181.5 parts 2,2'-Azobis(2-methylbutyronitrile) 1.5 parts The resulting dispersion was an opaque white stable dispersion having a solid content of 20% and an average particle diameter (of resin particles) of 254 nm.

EXAMPLE 4

Polymerization was conducted in the same manner as in Example 1 except that the mixture used in Example 1 was changed to the following mixture of monomers, solvents and an initiator.

Blemmer PME-4000 5 parts

Acrylamide 92 parts

N-methylolacrylamide 3 parts

Ethylene glycol monobutyl ether 160 parts

Deionized water 40 parts

Ammonium persulfate 1.5 parts

The resulting dispersion was an opaque white stable dispersion having a solid content of 20% and an average particle diameter (of resin particles) of 629 nm.

EXAMPLE 5

Polymerization was conducted in the same manner as in Example 1 except that the mixture used in Example 1 was changed to the following mixture of monomers, a solvent and an initiator.

Blemmer PME-4000 40 parts
Acrylamide 40 parts
N-methylolacrylamide 20 parts
Propylene glycol monomethyl ether 200 parts
2,2'-Azobis(2-methylbutyronitrile) 1.5 parts The resulting dispersion was an opaque white stable dispersion having a solid content of 20% and an average particle diameter (of resin particles) of 339 nm.

EXAMPLE 6

Polymerization was conducted in the same manner as in Example 1 except that the mixture used in Example 1 was changed to the following mixture of monomers, a solvent and an initiator.

RMA-300M 20 parts
Acrylamide 40 parts
Methacrylamide 15 parts
N-methylolacrylamide 15 parts
2-Hydroxyethyl methacrylate 10 parts
Propylene glycol monomethyl ether 200 parts
2,2'-Azobis(2-methylbutyronitrile) 1.5 parts The resulting dispersion was an opaque white stable dispersion having a solid content of 20% and an average particle diameter (of resin particles) of 339 nm.

COMPARATIVE EXAMPLE 1

Polymerization was conducted in the same manner as in Example 1 except that the mixture used in Example 1 was changed to the following mixture of monomers, a solvent and an initiator.

Acrylamide 75 parts
N-methylol acrylamide 25 parts
Propylene glycol monomethyl ether 200 parts
2,2'- Azobis(2-methylbutyronitrile) 1.5 parts The resulting polymer became large agglomerates and no stable dispersion could be obtained.

COMPARATIVE EXAMPLE 2

Polymerization was conducted in the same manner as in Example 1 except that the Blemmer PME-4000 used in Example 1 was changed to a polyethylene glycol 4000 having no polymerizable double bond (a product of Wako Pure Chemical Industries, Ltd. ). The resulting polymer became large agglomerates and no stable dispersion could be obtained.

COMPARATIVE EXAMPLE 3

Polymerization was conducted in the same manner as in Example 3 except that 38.5 parts of the polyvinylpyrrolidone macromonomer solution (solid content: 52%) obtained in Production Example 2, used in Example 3 was changed to 40 parts of the 50% polyvinylpyrrolidone solution obtained in Production Example 1. The resulting polymer became large agglomerates and no stable dispersion could be obtained.

COMPARATIVE EXAMPLE 4

Polymerization was conducted in the same manner as in Example 1 except that the mixture used in Example 1 was changed to the following mixture of monomers, a solvent and an initiator.

Blemmer PME-4000 1 part
Acrylamide 89 parts
N-methylol acrylamide 10 parts
Propylene glycol monomethyl ether 200 parts
2,2'-Azobis(2-methylbutyronitrile) 1.5 parts The resulting polymer became large agglomerates and no stable dispersion could be obtained.

COMPARATIVE EXAMPLE 5

Polymerization was conducted in the same manner as in Example 1 except that the mixture used in Example 1 was changed to the following mixture of monomers, solvents and an initiator.

RMA-300M 55 parts
Acrylamide 15 parts
N-methylolacrylamide 10 parts
2-Hydroxyethyl methacrylate 20 parts
Propylene glycol monomethyl ether 140 parts
Deionized water 60 parts
Ammonium persulfate 1.5 parts The resulting polymer did not become particles and became a gel.

COMPARATIVE EXAMPLE 6

Polymerization was conducted in the same manner as in Example 1 except that the mixture used in Example 1 was changed to the following mixture of monomers, a solvent and an initiator.

Blemmer PME-4000 20 parts
Acrylamide 80 parts
Propylene glycol monomethyl ether 200 parts
2,2-Azobis(2-methylbutyronitrile) 1.5 parts The resulting dispersion was an opaque white stable dispersion having a solid content of 20% and an average particle diameter (of resin particles) of 195 nm. The dispersion, however, dissolved in water when diluted with water.

COMPARATIVE EXAMPLE 7

Polymerization was conducted in the same manner as in Example 1 except that the mixture used in Example 1 was changed to the following mixture of monomers, solvents and an initiator.

Blemmer PME-4000 20 parts
Acrylamide 40 parts
N-methylolacrylamide 40 parts
Propylene glycol monomethyl ether 160 parts
Deionized water 40 parts
Ammonium persulfate 1.5 parts The resulting polymer became large agglomerates and no stable dispersion could be obtained.

COMPARATIVE EXAMPLE 8

170 parts of propylene glycol monomethyl ether and 30 parts of deionized water were placed in a flask equipped with a nitrogen inlet tube, an Allihn condenser, a dropping funnel and a mechanical stirrer, and heated to 100° C. Then, the following mixture of monomers, solvents, an initiator and strong acid catalyst was dropped into the flask in 5 hours. After the dropping, the mixture was kept at 100° C. for 3 hours.

Blemmer PME-4000 10 parts
Acrylamide 25 parts
N-methylolacrylamide 10 parts
Styrene 55 parts
Propylene glycol monomethyl ether 170 parts
Deionized water 30 parts
Ammonium persulfate 2 parts
Dodecylbenzene sulfonic acid 0.5 part The resulting dispersion was an opaque white stable dispersion having a solid content of 20% and an average particle diameter (of resin particles) of 539 nm.

Preparation of hydrophilic film-forming coating compositions

Using the dispersions of resin fine particles, obtained in Examples 1–6 and Comparative Examples 6 and 8, the hydrophilic film-forming coating compositions of Examples 7–14 and Comparative Examples 9–10 shown below were prepared.

EXAMPLES 7–14 AND COMPARATIVE EXAMPLES 9–10

Hydrophilic film-forming coating compositions were prepared by mixing and stirring the following components in the following amounts.

An aqueous PVA solution (solid content: 16%) obtained by dissolving, in water, a almost completely saponified PVA [Poval PVA-117 (trade name) manufactured by Kuraray Co., Ltd.]

100 parts (16 parts as solid) Diisopropoxy-bis(acetylacetonato)titanium 1 part Dispersion of resin fine particles, obtained in one of Examples 1–6 and Comparative Examples 6 and 8

Parts (as solid) shown in Table 1

<Test methods>
Preparation of coated plates for test

Each of the hydrophilic film-forming coating compositions obtained in Examples 7–14 and Comparative Examples 9–10 was coated on a chromate-treated aluminum plate (A1050; thickness: 0.1 mm) in a film thickness (as dried) of 1 μm by the use of a bar coater. The resulting aluminum plate was subjected to baking for 45 seconds in a hot air of 220° C. so that the temperature of the aluminum plate reached 215° C., whereby a coated plate was obtained. A volatile press oil was applied onto the coated plate, followed by drying at 150° C. for 5 minutes, to obtain various coated plates for test. Each of the coated plates for test was tested for hydrophilicty (water wettability and contact angle of water drop) according to the following test methods. The test results are shown in Table 1.

Tests for hydrophilicity

Each of the following two coated plates was tested-for water wettability and contact angle of water drop according to the following methods.

(1) A coated plate for test obtained above
(2) A coated plate obtained by immersing the coated plate (1) in a running tap water [running rate=15 kg/hr per m² of the coated plate (1)] for 7 hours, pulling it up, drying it in a room for 17 hours (this wet and dry process is hereinafter referred to as wet and dry cycle), and repeating the wet and dry cycle five times (five cycles).

Water Wettability

A coated plate (1) or (2) was immersed in a tap water placed in a beaker, for 10 seconds and then pulled up. Immediately, the water-wet condition of the plate surface was examined visually and rated according to the following yardstick.

O: The whole plate surface is wetted with water and, even after 10 seconds from the pulling-up of plate, there is no unevenness of water on the surface.

Δ: The whole plate surface is wetted with water right after the pulling-up of plate but, after 10 seconds therefrom, water is present mostly on the center of the plate by water movement from the plate edge towards the center.

X: Water drops are formed right after the pulling-up of plate and the whole plate surface is not wetted.

Contact Angle of Water Drop

The contact angle between coated plate (1) or (2) and water was measured by drying the plate at 80° C. for 5 minutes and then subjecting the plate to contact angle measurement using a contact angle meter DCAA (a product of Kyowa Kagaku K.K.).

TABLE 1

| | Dispersion of resin fine particles | | Hydrophilicity | | | |
| | | | Initial | | after 5 wet and dry cycles | |
| | Kind | Amount (parts as solid content) | Water wettability | Contact angle of water | Water wettability | Contact angle of water |
| --- | --- | --- | --- | --- | --- | --- |
| Example 7 | Example 1 | 7 | O | 10° | O | 15° |
| Example 8 | Example 2 | 7 | O | 12° | O | 17° |
| Example 9 | Example 3 | 7 | O | 10° | O | 15° |
| Example 10 | Example 4 | 7 | O | 14° | O | 16° |
| Example 11 | Example 5 | 7 | O | 8° | O | 10° |
| Example 12 | Example 6 | 7 | O | 12° | O | 18° |
| Example 13 | Example 1 | 7 | O | 15° | O | 20° |
| Example 14 | Example 1 | 4 | O | 7° | O | 10° |
| Comparative Example 9 | Comparative Example 6 | 20 | O | 17° | Δ | 30° |
| Comparative Example 10 | Comparative Example 8 | 7 | Δ | 23° | X | 41° |

What is claimed is:

1. Hydrophilic crosslinked polymer fine particles made of a copolymer composed of:

2–50% by weight of (a) a hydrophilic monomer having, in the molecule, at least one polymerizable double bond and a polyoxyalkylene or polyvinylpyrrolidone chain, 20–97% by weight of (b) at least one (meth)acrylamide monomer selected from the group consisting of the compounds represented by the following general formula 1:

$$CH_2=C\begin{matrix}R^1\\|\\C-N-R^2\\\|\ \ |\\O\ \ R^3\end{matrix} \quad\quad 1$$

wherein $R^1$ is a hydrogen atom or a methyl group; and $R^2$ and $R^3$ may be the same or different and are each a hydrogen atom or an alkyl group having 1–5 carbon atoms with a proviso that the sum of the carbon atoms of $R^2$ and $R^3$ is 5 or less, 1–30% by weight of (c) a crosslinkable unsaturated monomer having, in the molecule, at least one N-methylol or N-alkoxymethyl group and a polymerizable double bond, and 0–50% by weight of (d) a monomer other than the above (a), (b) and (c), having a polymerizable unsaturated group in the molecule.

2. Polymer fine particles according to claim 1, wherein the hydrophilic monomer (a) has one polymerizable double bond in the molecule.

3. Polymer fine particles according to claim 1, wherein the hydrophilic monomer (a) is selected from the group consisting of the compounds represented by the following general formulas 2, 3 and 4:

$$CH=C\begin{matrix}R^4\ \ R^5\\|\ \ \ |\\\ \ \ \ \ R^6\\|\\C\text{-}(OCH_2CH)_n\text{-}R^7\\\|\\O\end{matrix} \quad\quad 2$$

wherein $R^4$, $R^5$ and $R^6$ may be the same or different and are each a hydrogen atom or a methyl group; n is an integer of 10–200; $R^7$ is —OH, —OCH$_3$, —SO$_3$H or —SO$_3^-$M$^+$, where M$^+$ is Na$^+$, K$^+$, Li$^+$, NH$_4^+$ or an organic ammonium group; and $R^6$s in the n groups represented by:

$$-(OCH_2CH)-\atop{|\atop R^6}$$

may be the same or different, $$\begin{matrix}R^4\ \ R^5\\|\ \ \ |\\CH=C\\\ \ \ \ \ \ \ \langle\bigcirc\rangle\text{-}(OCH_2CH)_n\text{-}R^7\\\ \ \ \ \ \ \ \ \ \ \ \ \ \ \ \ \ \ \ \ \ \ |\\\ \ \ \ \ \ \ \ \ \ \ \ \ \ \ \ \ \ \ \ \ \ R^6\end{matrix} \quad\quad 3$$

wherein $R^4$, $R^5$, $R^6$, $R^7$ and n have the same definitions as given above, $$\begin{matrix}R^4\ \ R^5\\|\ \ \ |\\CH=C\\\ \ \ \ \ |\\\ \ \ \ \ X-(CH_2-CH-)_m-H\\\ \ \ \ \ \ \ \ \ \ \ \ \ \ \ |\\\ \ \ \ \ \ \ \ \ \ \ \ \ \ \ N\\\ \ \ \ \ \ \ \ \ \ \ \ \ \ /\ \ \ \\\diagdown=O\end{matrix} \quad\quad 4$$

(wherein $R^4$ and $R^5$ have the same definitions as given above; X is a bivalent organic group having 5–10 carbon atoms, which may contain an O, S or N atom(s); and m is an integer of 10–100).

4. Polymer fine particles according to claim 3, wherein the hydrophilic monomer (a) are a compound of formula 2 or 3.

5. Polymer fine particles according to claim 4, wherein n is an integer of 30–200.

6. Polymer fine particles according to claim 4, wherein $R^4$ is a hydrogen atom, $R^5$ is a hydrogen atom or a methyl group, and $R^6$ is a hydrogen atom.

7. Polymer fine particles according to claim 1, wherein the (meth)acrylamide monomer (b) is selected from the group consisting of acrylamide, methacrylamide, N-methylacrylamide, N-methylmethacrylamide, N,N-dimethylacrylamide, N,N-dimethylmethacrylamide, N-ethylacrylamide, N-ethylmethacrylamide, N-n-propylacrylamide, N-n-propylmethacrylamide, N-isopropylacrylamide, N-isopropylmethacrylamide and N-n-butylacrylamide.

8. Polymer fine particles according to claim 1, wherein the crosslinking unsaturated monomer (c) has, in the molecule, one N-methylol or N-C$_{1-6}$ alkoxymethyl group and one polymerizable double bond.

9. Polymer fine particles according to claim 1, wherein the crosslinking unsaturated monomer (c) is selected from the group consisting of N-methylolacrylamide, N-methylolmethacrylamide, N-methoxymethylacrylamide, N-methoxymethylmethacrylamide, N-ethoxymethylacrylamide, N-ethoxymethylmethacrylamide, N-n-butoxymethylacrylamide and N-n-butoxymethylmethacrylamide.

10. Polymer fine particles according to claim 1, wherein the monomer (d) is selected from the group consisting of a C$_{1-24}$ alkyl or cycloalkyl ester of (meth)acrylic acid, a C$_{2-8}$ hydroxyalkyl ester of (meth)acrylic acid, a carboxyl group-containing unsaturated monomer, a polymerizable unsaturated nitrile, an aromatic vinyl compound, a C$_{3-8}$ nitrogen-containing alkyl ester of (meth)acrylic acid, an epoxy group-containing unsaturated monomer, an α-olefin, a diene compound, a vinyl ester and a vinyl ether.

11. Polymer fine particles according to claim 1, made of a copolymer composed of:

2–40% by weight of the hydrophilic monomer (a),

40–97% by weight of the (meth)acrylamide type monomer (b),

2–20% by weight of the crosslinkable unsaturated monomer (c), and

0–40% by weight of the monomer (d).

12. Polymer fine particles according to claim 1, having an average particle diameter of 0.03–1 μm.

13. Polymer fine particles according to claim 1, which are produced by polymerizing the hydrophilic monomer (a), the (meth)acrylamide monomer (b), the crosslinking unsaturated monomer (c) and, as necessary, the monomer (d) in the absence of any dispersion stabilizer in a water-miscible organic solvent capable of dissolving the above monomers but substantially incapable of dissolving the copolymer formed or in a mixed solvent of said water-miscible organic solvent and water.

* * * * *